United States Patent [19]

Frasier

[11] Patent Number: 5,758,293
[45] Date of Patent: May 26, 1998

[54] SUBSCRIBER UNIT AND DELIVERY SYSTEM FOR WIRELESS INFORMATION RETRIEVAL

[75] Inventor: James R. Frasier, Marengo, Ill.

[73] Assignee: Motorola Inc., Schaumburg, Ill.

[21] Appl. No.: 610,566

[22] Filed: Mar. 6, 1996

[51] Int. Cl.⁶ .................... H04M 11/00; H04Q 7/00
[52] U.S. Cl. .................................... 455/556; 455/426
[58] Field of Search .................... 379/59, 58, 63,
379/110; 455/54.2, 33.1, 4.2, 89, 90, 556,
426, 565, 557, 575

[56] References Cited

U.S. PATENT DOCUMENTS

| | | | |
|---|---|---|---|
| 4,694,490 | 9/1987 | Harvey et al. | 188/73.44 |
| 4,912,705 | 3/1990 | Paneth et al. | 370/334 |
| 4,965,825 | 10/1990 | Harvey et al. | 380/9 |
| 4,972,457 | 11/1990 | O'Sullivan | 379/61 X |
| 5,014,125 | 5/1991 | Pocock et al. | 379/105 X |
| 5,023,905 | 6/1991 | Wells et al. | 379/110 X |
| 5,073,900 | 12/1991 | Mallinckrodt | 455/33.1 X |
| 5,089,826 | 2/1992 | Yano et al. | 379/110 X |
| 5,175,869 | 12/1992 | Murata | 455/89 X |
| 5,181,107 | 1/1993 | Rhoades | 455/4.2 X |
| 5,191,410 | 3/1993 | McCalley et al. | 379/105 X |
| 5,218,188 | 6/1993 | Hanson | 455/89 X |
| 5,247,347 | 9/1993 | Litteral et al. | 379/105 X |
| 5,371,898 | 12/1994 | Grube et al. | 455/33.1 X |
| 5,398,280 | 3/1995 | MacConnell | 379/110 X |
| 5,465,401 | 11/1995 | Thompson | 455/90 X |
| 5,557,541 | 9/1996 | Schulhof et al. | 364/514 |
| 5,585,850 | 12/1996 | Schwaller | 455/33.1 X |
| 5,594,779 | 1/1997 | Goodman | 379/59 |

*Primary Examiner*—Allen R. MacDonald
*Assistant Examiner*—Scott Richardson
*Attorney, Agent, or Firm*—Jeffrey G. Toler

[57] ABSTRACT

Information is retrieved from an information source by wirelessly receiving, at a cellular telephone switch, a request by a subscriber unit for a predetermined selection of information. The request is communicated to the information source using at least one of a satellite communication system and a wireless data network. The information source retrieves the predetermined selection of information. A transmission of the predetermined selection to the cellular telephone switch is inhibited if a utilization level of at least one of the satellite communication system and the wireless data network exceeds a threshold. When the utilization level is below the threshold, the predetermined selection is communicated to the cellular telephone switch. The predetermined selection is then forwarded to the subscriber unit when a utilization level of the cellular telephone switch is below a predetermined threshold.

19 Claims, 4 Drawing Sheets

SUBSCRIBER UNIT AND DELIVERY SYSTEM FOR WIRELESS INFORMATION RETRIEVAL

FIELD OF THE INVENTION

The present invention relates to methods and systems for wireless information retrieval.

BACKGROUND OF THE INVENTION

On-line electronic information services are being increasingly utilized by individuals having personal computers to retrieve various types of information. Typically, a user having a personal computer equipped with a modem dials into a service provider, such as an Internet gateway, an on-line service (such as America Online, CompuServe, or Prodigy) or an electronic bulletin board, to download data representative of information desired by the user. This information is typically downloaded in real-time, i.e. the information is downloaded contemporaneously with a request for the information. Examples of information downloaded in this manner include electronic versions of newspapers, electronic versions of books (such as an encyclopedia), electronic versions of articles, and financial information. The information can include both text and graphics in any of these examples.

This approach to downloading information is either difficult or impossible in third world countries and emerging market countries. These countries typically do not have a fiber optic infrastructure and/or a cable infrastructure required to provide on-line electronic information services to its citizens.

BRIEF DESCRIPTION OF THE DRAWINGS

The invention is pointed out with particularity in the appended claims. However, other features of the invention will become more apparent and the invention will be best understood by referring to the following detailed description in conjunction with the accompanying drawings in which:

DETAILED DESCRIPTION OF A PREFERRED EMBODIMENT

Embodiments of the present invention advantageously provide a wireless information retrieval system which can utilize existing communication infrastructures to download alpha, numeric, and graphic data from an information source. The wireless information retrieval system includes a tetherless subscriber unit which receives the data and transfers the data onto a computer-readable storage medium.

Embodiments of the present invention provide a low-cost approach for receiving information without requiring a modem attached to a computer. Further, embodiments of the present invention provide a low-cost option to on-demand services provided by fiber and cable networks. As a result, the information superhighway becomes accessible to individuals in third world and emerging market countries, educators in remote locations, and individuals at military outposts, for example.

Figure 1:
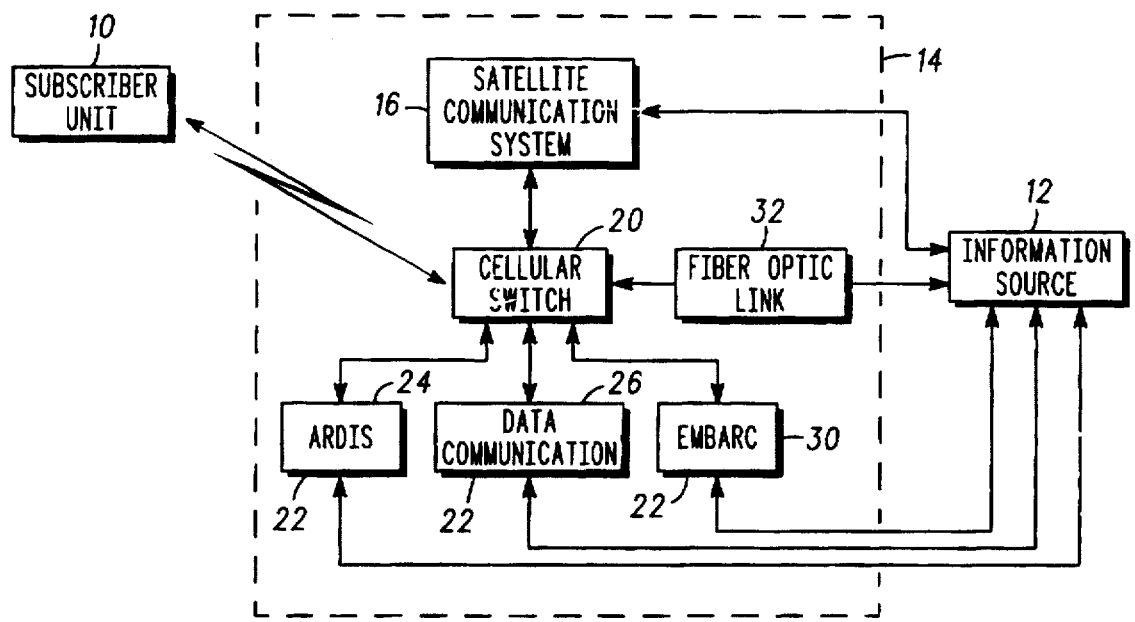
FIG. 1 is a block diagram of an embodiment of a system for wireless information retrieval in accordance with the present invention.

FIG. 1 is a block diagram of an embodiment of a system for wireless information retrieval in accordance with the present invention. The system includes a subscriber unit 10 which is utilized by a subscriber to wirelessly retrieve information from an information source 12. The information source 12 can be an electronic library containing information in the form of alpha, numeric, and/or graphic data. The information source 12 can include one or more file servers which act as an electronic archive for information such as books, articles, periodicals, newspapers, and training and educational materials.

The subscriber unit 10 receives the information from the information source via a delivery system 14. Preferably, the delivery system 14 utilizes components which provide wireless communication for other purposes.

For example, the delivery system 14 can include a satellite communication system 16, such as a global satellite communication system used for personal communication services. The satellite communication system 16 can include the Iridium, low-earth orbit satellite system, for example.

The delivery system 14 can include a cellular telephone switch 20, used for standard cellular telephone communications, for delivering the information to the subscriber unit 10. Further, the delivery system 14 can include one or more wireless data communication networks 22. Examples of existing wireless data communication networks include an ARDIS network 24 in the United States, a DATACOM network 26 in Europe, and an EMBARC network 30.

The use of the above-described components is beneficial in exploiting existing communication infrastructures to provide the delivery system 14. Other components beneficial for this purpose include existing police, military, and emergency communication systems.

In the embodiment of FIG. 1, the subscriber unit 10 wirelessly communicates exclusively with the cellular telephone switch 20. In alternative embodiments, however, the subscriber unit 10 can communicate directly with at least one of the cellular telephone switch 20, the satellite communication system 16, and the wireless data networks 22.

In accordance with the embodiment of FIG. 1, the cellular telephone switch 20 receives the information from the information source 12 by any of a plurality of different communication links. The information can be received via a fiber optic link 32 which links the information source 12 to the cellular telephone switch 20. In addition, the information can be received via the satellite communication system 16 which links the information source 12 to the cellular telephone switch 20. Further, the information can be received by the cellular switch 20 via a link comprised of the satellite communication system 16 and a wireless data network such as the EMBARC network 30. Still further, the information can be received by the cellular switch 20 via a wireless data network such as the ARDIS network 24 or the DATACOM network 26.

The specific link or communication path used and the time at which the specific link is used for information transfer depends on a utilization level of the components in the delivery system 14. It is noted that the components in the delivery system 14 may be utilized for non-retrieval purposes. For example, at least a portion of the utilization level of the satellite communication system 16 can result from at least one personal communication service. Similarly, at least a portion of the utilization level of the wireless data network can result from at least one non-retrieval service.

Figure 2:
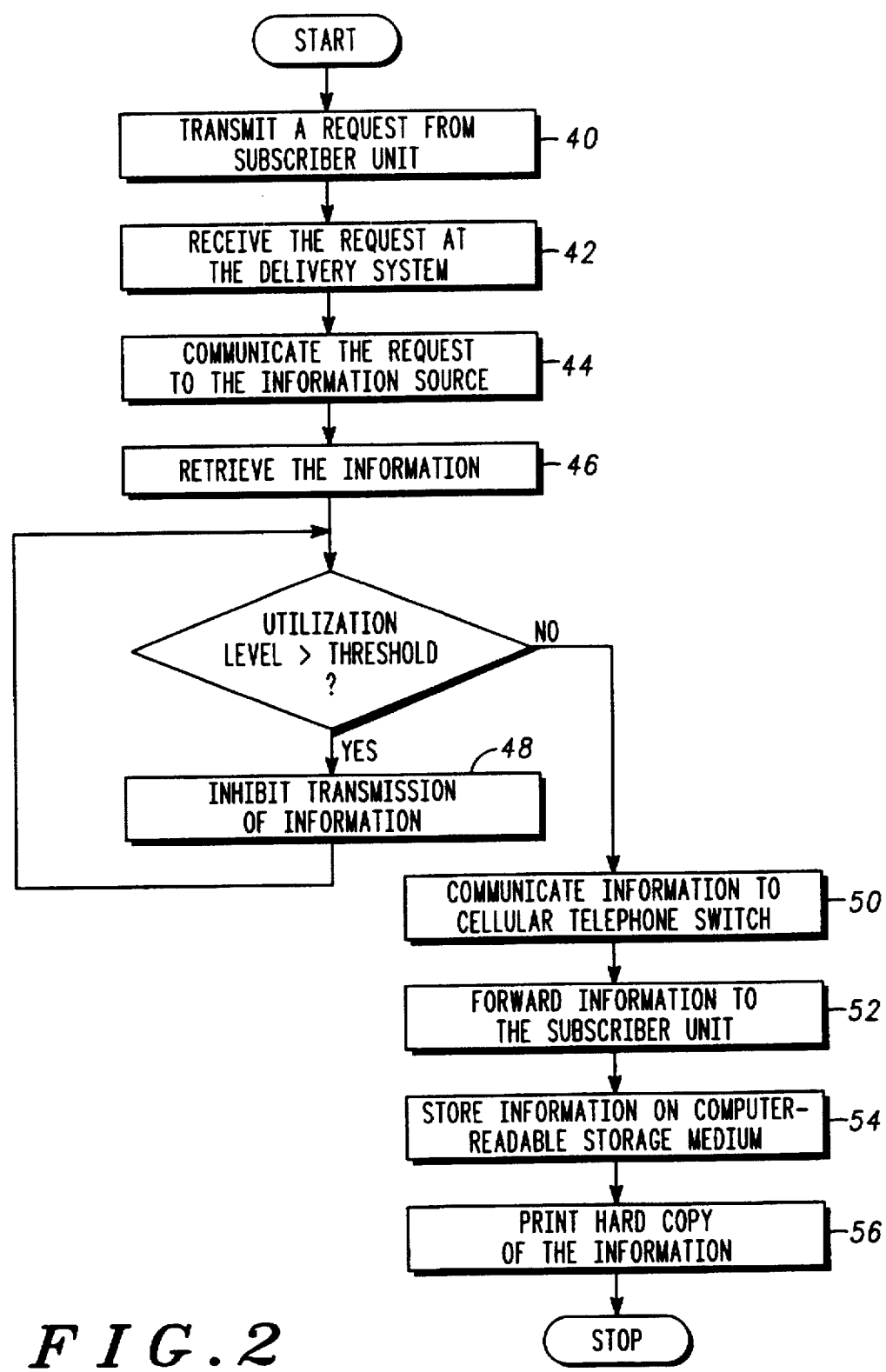
FIG. 2 is a flow chart of an embodiment of a method of wireless information retrieval in accordance with the present invention.

It is preferred that the delivery system 14 utilize the specific link whose relative utilization is least. If each of the components have a utilization level above a corresponding threshold, information transmissions to the subscriber unit 10 are inhibited. In one embodiment, the corresponding threshold is 60%. FIG. 2 is a flow chart of an embodiment of a method of wireless information retrieval in accordance with the present invention. As indicated by block 40, the method includes a step of transmitting a request for a predetermined selection of information from the subscriber unit 10. The request for information can include alpha and/or numeric data which indicates a predetermined selection of information which is to be retrieved from the information source 12.

As indicated by block 42, the method includes a step of receiving the request for the predetermined selection at the delivery system 14. As illustrated in the embodiment of FIG. 1, the request for information is wirelessly received by the cellular telephone switch 20.

The method further includes a step of communicating the request for information to the information source 12, as indicated by block 44. The request can be communicated using at least one of the satellite communication system 16, the wireless data networks 22, and the fiber optic link 32. In the embodiment of FIG. 1, the request can be communicated by any of the following paths: (i) from the cellular telephone switch 20 to a wireless data network to the satellite communication system 16 to the information source 12; (ii) from the cellular telephone switch 20 to a wireless data network to the information source 12; (iii) from the cellular telephone switch 20 to the satellite communication system 16 to the information source 12; and (iv) from the cellular telephone switch 20 to the fiber optic link 32 to the information source 12.

As indicated by block 46, a step of retrieving the predetermined selection is performed by the information source 12 based upon the request. If the utilization level of the delivery system 14 is above a predetermined threshold, the method includes a step inhibiting a transmission of the predetermined selection back to the subscriber unit 10, as indicated by block 48. The step of inhibiting the transmission can include a step of inhibiting a transmission of the predetermined selection to the cellular telephone switch if a utilization level of the satellite communication system 16, the wireless data networks 22, and the fiber optic link 32 exceeds a predetermined threshold.

If the utilization level of the delivery system is below the predetermined threshold, the information source 12 then performs steps to transmit the information back to the subscriber unit 10 via the delivery system 14. For the embodiment of FIG. 1, these steps include a step of communicating the predetermined selection of information from the information source 12 to the cellular telephone switch 20, as indicated by block 50. The predetermined selection is communicated using at least one of the satellite communication system 16, the wireless data networks 22, and the fiber optic link 32. In the embodiment of FIG. 1, the information can be communicated by any of the following paths: (i) from the information source 12 to the satellite communication system 16 to a wireless data network to the cellular telephone switch 20; (ii) from the information source 12 to a wireless data network to the cellular telephone switch 20; (iii) from the information source 12 to the satellite communication system 16 to the cellular telephone switch 20; and (iv) from the information source 12 to the fiber optic link to the cellular telephone switch 20. It is noted that path utilized to communicate the information to the subscriber unit 10 is not necessarily the same path utilized to communicate the request to the information source 12.

A step of wirelessly forwarding the predetermined selection to the subscriber unit 10 is performed by the cellular telephone switch 20, as indicated by block 52. This step is performed when a utilization level of the cellular telephone switch 20 is below a predetermined threshold. It is noted that at least a portion of the utilization of the cellular telephone switch can result from at least one standard cellular telephone call.

Once received by the subscriber unit 10, the subscriber unit 10 performs a step of storing the information on a computer-readable storage medium, as indicated by block 54. The computer-readable storage medium can include a computer diskette, a PC memory card, or the like. Optionally, a step of printing a hard copy of the information is performed, as indicated by block 56.

Figure 3:
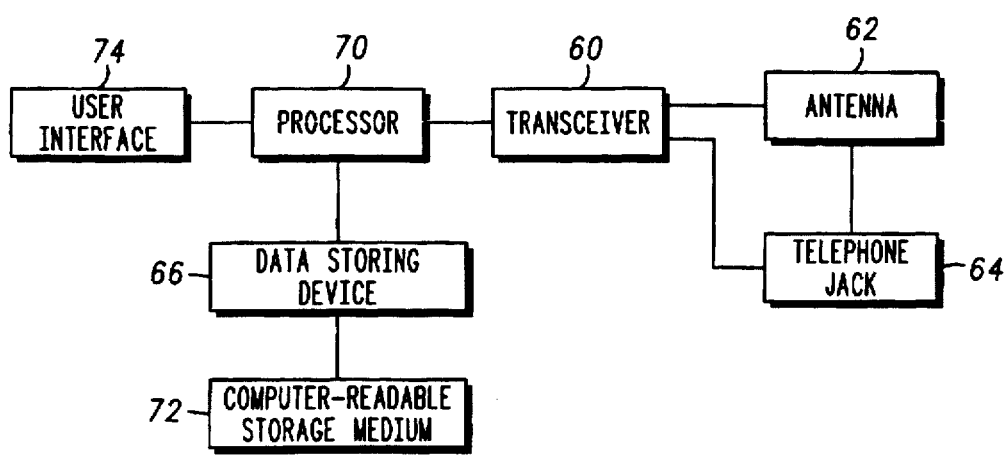
FIG. 3 is a block diagram of an embodiment of a subscriber unit for wireless information retrieval.

FIG. 3 is a block diagram of an embodiment of a subscriber unit for wireless information retrieval. The subscriber unit includes a transceiver 60 and an antenna 62 for communicating with the delivery system 14. Typically, data is communicated between the subscriber unit and the delivery system 14 using radio frequency signals. Alternatively, data is communicated using voice frequency signals via a telephone jack 64 coupled to the transceiver 60.

Data received by the transceiver 60 is communicated to a data storing device 66 by a processor 70. The data storing device 66 stores a representation of the information downloaded from the information source 12 onto a computer-readable storage medium 72. The computer-readable storage medium 72 can be a computer diskette, in which case the data storing device 66 includes a disk drive. Alternatively, the computer-readable storage medium 72 can be a PC card, such as a PCMCIA card, in which case the data storing device 66 includes a PC card writer. In general, the data storing device 66 can store a representation of the information in either an electrical form, a magnetic form, or an optical form. The data stored on the computer-readable storage medium 72 can be removed from the data storing device 66 to allow a subsequent reading and display by a personal computer or a personal digital assistant.

A user interface 74 is included to allow a user to enter alpha and/or numeric data for requesting a predetermined selection of information. The user interface 74 communicates the request to the transceiver 60 via the processor 70. The user interface 74 can include a telephone keypad to allow the user to dial a predetermined phone number associated with the delivery system 14. A standard cellular or wireline telephone call request is initiated in response thereto.

For a wireless request, the transceiver 60 communicates the request in a cellular call to the cellular telephone switch 20. The cellular switch 20 answers the call and proceeds with processing in accordance with the method of FIG. 2. After the cellular switch 20 receives the request, the delivery system 14 can hang-up on the call until sufficient resources are available to deliver the information to the subscriber unit. Once the utilization level of the delivery system 14 is sufficiently low, the cellular switch 20 calls the subscriber unit to forward the information. The transceiver 60 automatically answers the subsequent call to wirelessly receive data representative of the predetermined selection of information. Hence, embodiments of the present invention act to download the information in a non-real-time manner.

Figure 4:
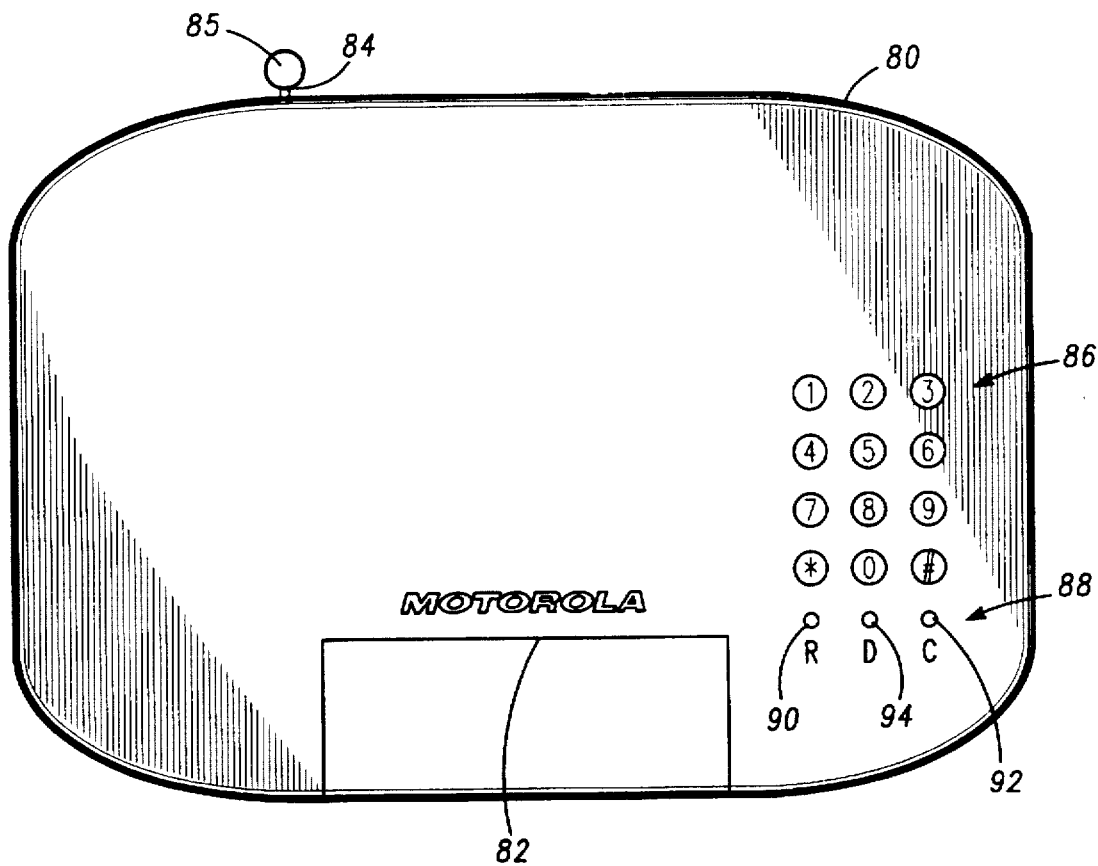
FIG. 4 is a top view of an embodiment of a subscriber unit for wireless information retrieval.

FIG. 4 is a top view of an embodiment of a subscriber unit for wireless information retrieval. The subscriber unit includes a unitary housing 80 which houses the transceiver 60, the data storing device 66, and the processor 70. The data storing device 66 includes a disk drive 82 for storing information on a computer diskette. An antenna port 84 is provided to receive an antenna 85 for wireless communication with the delivery system 14. The antenna port 84, which can be a screw-in port, is coupled to the transceiver 60 within the unitary housing 80.

A telephone keypad 86 is included to form the user interface 74. The telephone keypad receives, from the user, a request for a predetermined selection of information. A series of visual indicators 88 are provided to indicate a status of the information retrieval. A first indicator 90 indicates if data is being received by the subscriber unit. A second indicator 92 indicates if a data transmission has completed. A third indicator 94 indicates if a diskette needs to be inserted in the disk drive 82. The series of visual indicators 88 can be embodied by any of a variety of display elements, such as light-emitting diodes or liquid-crystal display elements.

Figure 5:
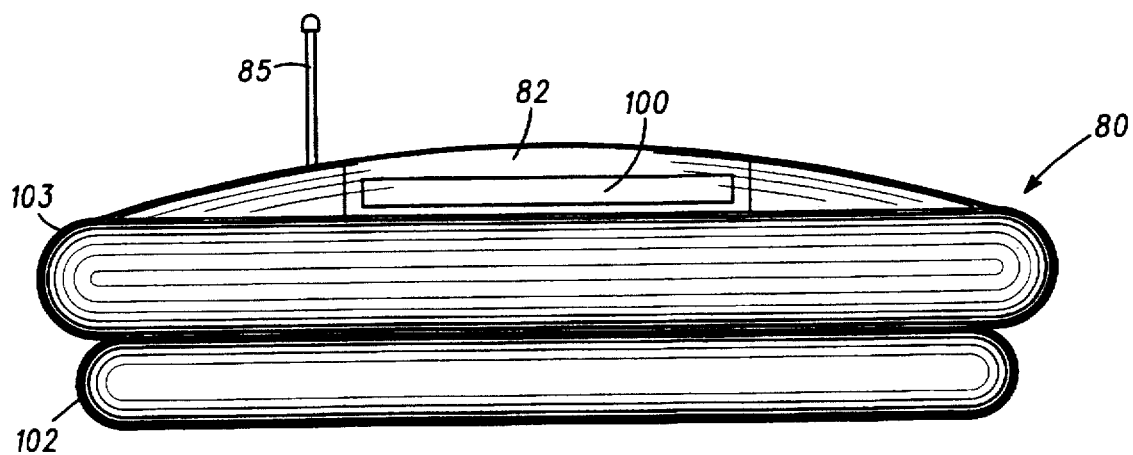
FIG. 5 is a front view of the embodiment of the subscriber unit of FIG. 4.

FIG. 5 is a front view of the embodiment of the subscriber unit of FIG. 4. The disk drive 82 includes an opening 100 for receiving the diskette. The unitary housing 80 includes a base member 102 for resting the subscriber unit on a surface, and a top portion 103. The base member 102 receives a battery pack which provides power to components of the subscriber unit. In a preferred embodiment, the top portion 103 has a width of about 9 inches.

Figure 6:
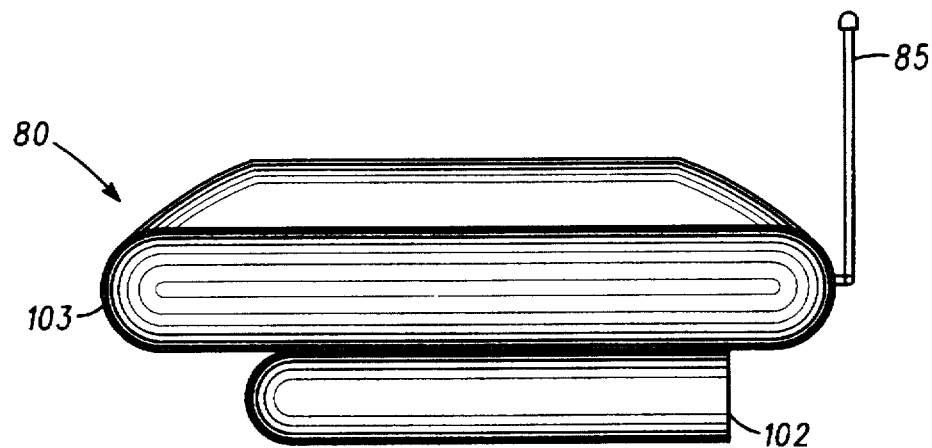
FIG. 6 is a side view of the embodiment of the subscriber unit of FIG. 4.

FIG. 6 is a side view of the embodiment of the subscriber unit of FIG. 4. The side view illustrates the unitary housing 80, its base portion 102 and its top portion 103, and the antenna 85. In a preferred embodiment, the top portion 103 has a depth of about 5 inches, and the base portion 102 has a depth of about 2 ⅞ inches.

Figure 7:
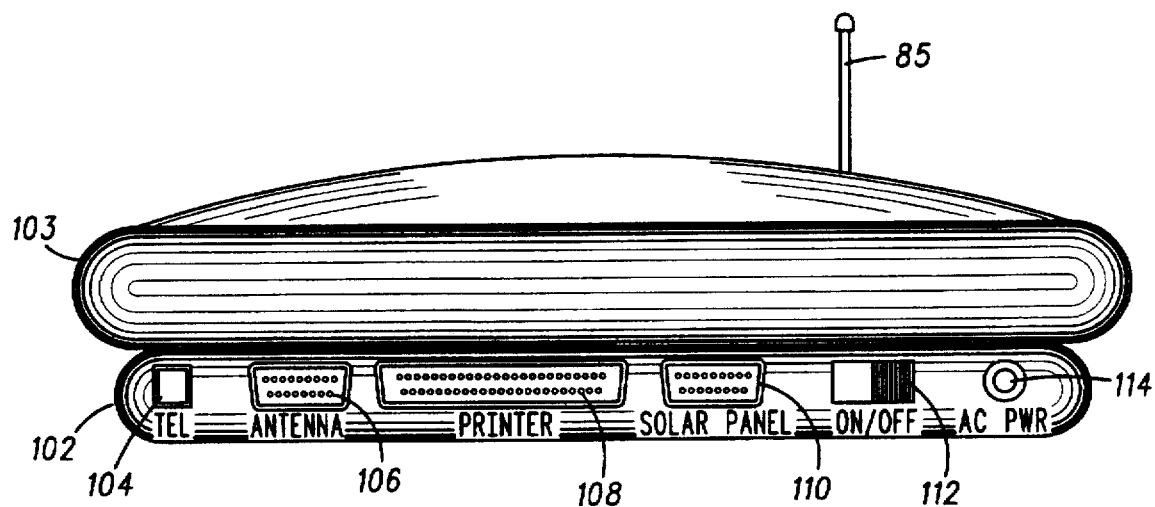
FIG. 7 is a back view of the embodiment of the subscriber unit of FIG. 4.

FIG. 7 is a back view of the embodiment of the subscriber unit of FIG. 4. A back portion of the base portion 102 includes a telephone jack 104, an auxiliary antenna port 106, a printer port 108, a solar power receiving port 110, an on/off switch 112, and an AC power jack 114. The telephone jack 104 is utilized for receiving a telephone line connector to provide a wireline connection to the information source 12. The auxiliary antenna port 106 provides means for connecting another antenna, such as an outdoor antenna, to improve radio frequency communication with the delivery system 14. The printer port 108 provides means for connecting a printer to the subscriber unit. The printer can be utilized for printing a hard copy of information received by the subscriber unit.

The AC power jack 114 is provided to receive a connector from an AC adaptor in order to power the subscriber unit. As an alternative to AC power, the solar power receiving port 110 is included to interface with one or more solar panels for powering the subscriber unit. In some areas of the world, solar power may provide the only practical means for powering the subscriber unit. The on/off switch 112 allows the user to selectively activate and deactivate the subscriber unit.

In a preferred embodiment, the top portion 103 has a height of 1 ½ inches. The base portion 102, in this embodiment, has a height of 1 inch and a width of 7 ½ inches.

Thus, there has been described herein a concept, as well as several embodiments including preferred embodiments of a subscriber unit and a delivery system for wireless information retrieval.

Because the various embodiments of the present invention can utilize existing wireless communication infrastructure, they provide a significant improvement in increasing the accessibility of electronic information transfer to individual's in third world and emerging market countries without requiring a significant fiber and cable system infrastructure.

It will be apparent to those skilled in the art that the disclosed invention may be modified in numerous ways and may assume many embodiments other than the preferred form specifically set out and described above.

Accordingly, it is intended by the appended claims to cover all modifications of the invention which fall within the true spirit and scope of the invention.

What is claimed is:

1. A subscriber unit for wirelessly retrieving information from an information source, the information non-displayable by the subscriber unit, the subscriber unit comprising:

a telephone keypad which receives, from a user, a request for a predetermined selection of information;

a transceiver operatively associated with the telephone keypad to wirelessly communicate the request in a first cellular call to a cellular telephone switch linked to the information source, wherein the cellular telephone switch has a lesser utilization level for the second cellular call than for the first cellular call, the transceiver having a content-independent, automatic-answering receiver operative to wirelessly receive data representative of the predetermined selection in a second cellular call from the cellular telephone switch;

a data storing device operatively associated with the transceiver to store the predetermined selection in a computer-readable form on a computer-readable storage medium, the computer-readable storage medium removable from the data storing device to allow a subsequent display of the predetermined selection using a computer; and a unitary housing which houses the telephone keypad, the transceiver, and the data storing device.

2. The subscriber unit of claim 1 wherein the data storing device includes a disk drive, and wherein the computer-readable storage medium includes a computer diskette, the subscriber unit further comprising a display element dedicated for indicating whether to insert a computer diskette into the disk drive.

3. The subscriber unit of claim 1 wherein the information consists of visual information including at least one of text and graphic data.

4. The subscriber unit of claim 1 wherein the predetermined selection of information includes at least one of text and graphic data displayable by the computer but non-displayable by the subscriber unit.

5. The subscriber unit of claim 1 wherein the unitary housing includes a top portion and a base portion, the base portion to receive a battery, the top portion supporting the telephone keypad and the data storage device.

6. The subscriber unit of claim 1 further comprising a display element dedicated for indicating if transmission of the data has completed.

7. A method of wireless information retrieval from an information source, the method comprising the steps of:

wirelessly receiving, at a cellular telephone switch, a request for a predetermined selection of information from a subscriber unit;

communicating the request to the information source using at least one of a satellite communication system and a wireless data network, wherein the satellite communication system and the wireless data network each have a corresponding utilization level;

retrieving the predetermined selection of information by the information source;

inhibiting a transmission of the predetermined selection to the cellular telephone switch based upon a first utilization level of the satellite communication system and a second utilization level of the wireless data network;

communicating the predetermined selection from the information source to the cellular telephone switch when at least one of the first utilization level and the second utilization level is below a corresponding threshold, the predetermined selection communicated using one of the satellite communication system and the wireless data network having a lesser utilization level; and wirelessly forwarding the predetermined selection from the cellular telephone switch to the subscriber unit when a third utilization level of the cellular telephone switch is below a predetermined threshold.

8. The method of claim 7 wherein the step of inhibiting includes inhibiting the transmission of the predetermined selection to the cellular telephone switch if the first utilization level is greater than or equal to a first threshold and the second utilization level is greater than or equal to a second threshold.

9. The method of claim 8 wherein the first threshold and the second threshold are less than 100%.

10. The method of claim 7 wherein the information is non-displayable by the subscriber unit.

11. The method of claim 7 wherein the request is received in a first cellular call to the cellular telephone switch by the subscriber unit, and wherein the predetermined selection is wirelessly forwarded by the cellular telephone switch in a second cellular call to the subscriber unit, wherein the cellular telephone switch has a lesser utilization level for the second cellular call than for the first cellular call.

12. The method of claim 11 further comprising the step of automatically answering the second cellular call, the second cellular call automatically answered independent of its content.

13. A system for wireless information retrieval comprising:

an information source;

a cellular telephone switch which wirelessly receives a request for a predetermined selection of information from a subscriber unit, the cellular telephone switch communicating the request to the information source using at least one of a satellite communication system and a wireless data network, wherein the satellite communication system and the wireless data network each have a corresponding utilization level;

wherein the information source retrieves the predetermined selection of information in response to receiving the request;

wherein a transmission of the predetermined selection to the cellular telephone switch is inhibited based upon a first utilization level of the satellite communication system and a second utilization level of the wireless data network;

wherein the predetermined selection is communicated from the information source to the cellular telephone switch when at least one of the first utilization level and the second utilization level is below a corresponding threshold, the predetermined selection communicated using one of the satellite communication system and the wireless data network having a lesser utilization level; and wherein the predetermined selection is wirelessly forwarded from the cellular telephone switch to the subscriber unit when a third utilization level of the cellular telephone switch is below a predetermined threshold.

14. The system of claim 13 wherein the transmission of the predetermined selection to the cellular telephone switch is inhibited if the first utilization level is greater than or equal to a first threshold and the second utilization level is greater than or equal to a second threshold.

15. The system of claim 14 wherein the first threshold and the second threshold are less than 100%.

16. The system of claim 13 wherein the information is non-displayable by the subscriber unit.

17. The system of claim 13 wherein the request is received in a first cellular call by the subscriber unit to the cellular telephone switch, and wherein the predetermined selection is wirelessly forwarded in a second cellular call to the subscriber unit by the cellular telephone switch, wherein the cellular telephone switch has a lesser utilization level for the second cellular call than for the first cellular call.

18. The system of claim 17 wherein the subscriber unit includes a content-independent automatic-answering receiver to automatically answer the second cellular call independent of its content.

19. The system of claim 13 wherein the subscriber unit comprises a disk drive to store the predetermined selection of information in a computer-readable form on a diskette, the diskette removable from the disk drive to allow a subsequent display of the predetermined selection of information using a computer, wherein the subscriber unit further comprises a display element dedicated for indicating whether to insert a computer diskette into the disk drive.

* * * * *